(12) United States Patent
Na (10) Patent No.: US 7,782,634 B2
(45) Date of Patent: Aug. 24, 2010

(54) SWITCHED-MODE POWER SUPPLY AND POWER SUPPLYING METHOD THEREOF

(75) Inventor: Tae-kwon Na, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 133 days.

(21) Appl. No.: 12/129,833

(22) Filed: May 30, 2008

(65) Prior Publication Data
US 2009/0046483 A1    Feb. 19, 2009

(30) Foreign Application Priority Data
Aug. 17, 2007    (KR) .................. 10-2007-0082940
May 23, 2008    (KR) .................. 10-2008-0048098

(51) Int. Cl.
*H02M 3/335* (2006.01)
(52) U.S. Cl. .................. 363/21.07; 363/21.15
(58) Field of Classification Search ............. 323/288, 323/293; 363/21.07, 21.15
See application file for complete search history.

(56) References Cited

U.S. PATENT DOCUMENTS

| | | | | |
|---|---|---|---|---|
| 5,838,556 A | * | 11/1998 | Yokoyama | ............... 363/21.15 |
| 6,788,556 B2 | * | 9/2004 | Hosotani et al. | ......... 363/21.15 |
| 6,816,392 B2 | * | 11/2004 | Takamatsu | ............... 363/21.15 |
| 6,984,968 B2 | | 1/2006 | Moon | |
| 7,200,016 B2 | * | 4/2007 | Ogawa | .................... 363/56.01 |
| 7,433,208 B2 | * | 10/2008 | Nishida et al. | ................ 363/19 |

FOREIGN PATENT DOCUMENTS

KR    2004-43420    5/2004

* cited by examiner

*Primary Examiner*—Shawn Riley
(74) *Attorney, Agent, or Firm*—Staas & Halsey LLP (57) ABSTRACT

A switched-mode power supply includes a converter to convert input power into output power having a predetermined voltage level by performing a switching operation; a switching controller to control the switching operation of the converter based on an indication of a voltage of the output power; and an output power voltage indicating unit to provide the indication of the voltage of the output power to the switching controller according to a characteristic of the output power voltage indicating unit that varies according to the size of a load receiving the output power converted by the converter.

20 Claims, 5 Drawing Sheets

SWITCHED-MODE POWER SUPPLY AND POWER SUPPLYING METHOD THEREOF

CROSS-REFERENCE TO RELATED APPLICATIONS

This application the benefit of Korean Patent Application No. 2007-82940 filed on Aug. 17, 2007, in the Korean Intellectual Property Office, and Korean Patent Application No. 2008-48098 filed on May 23, 2008, in the Korean Intellectual Property Office, the disclosures of which are incorporated herein by reference in their entirety.

BACKGROUND OF THE INVENTION

1. Field of the Invention

Aspects of the invention relate to a switched-mode power supply and a power supply method thereof, and more particularly to a switched-mode power supply capable of indicating a voltage of an output power and a power supplying method thereof.

2. Description of the Related Art

A switched-mode power supply rectifies alternating current (AC) power received from an external power source to obtain direct current (DC) power, converts the DC power by performing a switching operation, changes a voltage of the AC power using a transformer, and rectifies and smoothes the transformed AC power, thereby outputting smoothed DC power. However, the transformer may be omitted, and the level of the output DC power may be controlled by controlling the duty cycle of the switching operation. Such a switched-mode power supply has achieved widespread use because it has a lower power loss and generates less heat compared to a linear power supply that converts AC power into DC power using a passive element, such as a resistor, to reduce a voltage.

Figure 1A:
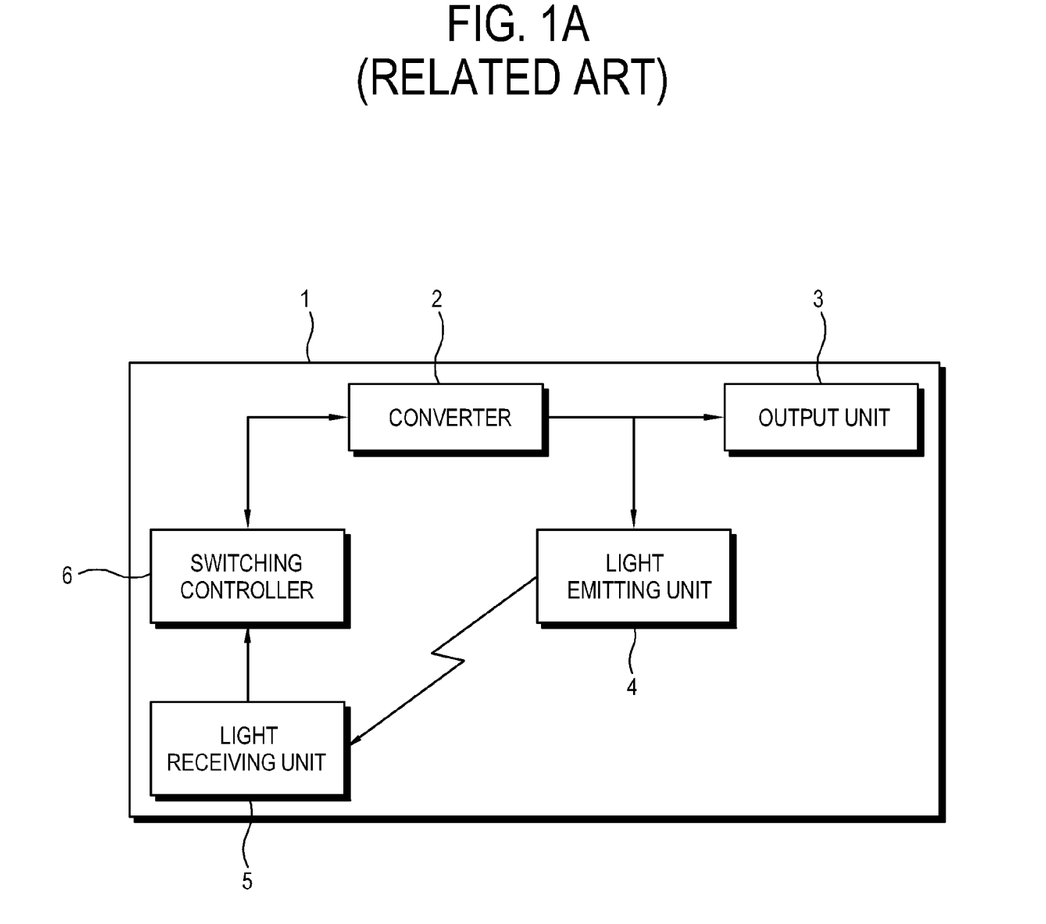
FIG. 1A is a block diagram of a switched-mode power supply according to the related art.

FIG. 1A is a block diagram of a switched-mode power supply according to the related art. As shown in FIG. 1A, the switched-mode power supply 1 according to the related art includes a converter 2 to convert input power into output power having a predetermined voltage by performing a switching operation, an output unit 3 to output the output power to an external load (not shown), a light emitting unit 4 to emit light indicative of the voltage of the output power when the voltage of the output power is equal to or greater than a predetermined threshold voltage, a light receiving unit 5 to receive the light emitted from the light emitting unit 4 and output a signal indicative of the voltage of the output power, and a switching controller 6 to control a switching operation of the converter 2 according to the voltage of the output power indicated by the signal output from the light receiving unit 5.

Figure 1B:
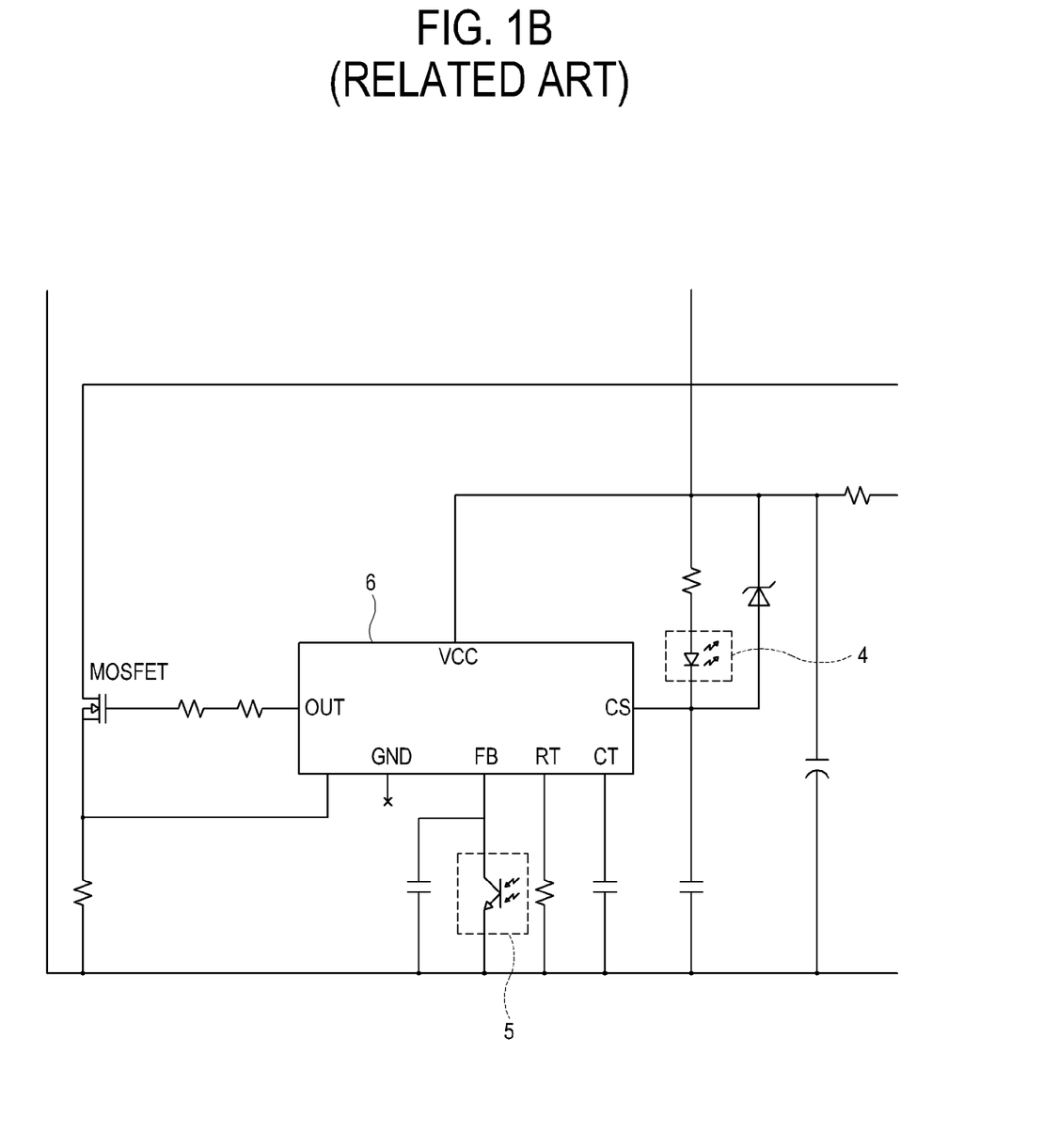
FIG. 1B is a circuit diagram of the switched-mode power supply of FIG. 1 according to the related art.

FIG. 1B is a circuit diagram of the switched-mode power supply 1 of FIG. 1 according to the related art. Referring to FIG. 1B, when the light indicative of the voltage of the output power is transmitted from the light emitting unit 4 to the light receiving unit 5, the signal indicative of the voltage of the output power that is output from the light receiving unit 5 is input to a feedback terminal FB of the switching controller 6 to which a capacitor is connected. The capacitor affects a response time of the switching controller 6 to a change in the signal indicative of the voltage of the output power that is output from the light receiving unit 5. The smaller the capacitor, the shorter or faster the response time, and the larger the capacitor, the longer or slower the response time.

However, the capacitor connected to the feedback terminal FB in the switched-mode power supply 1 according to the related art has a fixed value regardless of a size of the load that is receiving the output power from the output unit 3, so that a voltage that is actually applied to the feedback terminal FB of the switching controller 6 as a result of the effect of the capacitor may differ substantially from the signal indicative of the voltage of the output power that is output from the light receiving unit 5 if the load rapidly changes or noise is introduced into the system, thereby causing a malfunction of the switched-mode power supply 1, such as a shutdown, due to an inaccurate voltage being applied to the feedback terminal FB of the switching controller 6.

SUMMARY OF THE INVENTION

According to an aspect of the invention, a switched-mode power supply and a power supplying method thereof enable a load to be stably driven without malfunction by providing a slow response to a change in a voltage of an output power if the load is high.

According to an aspect of the invention, a switched-mode power supply and a power supplying method thereof provide a fast response to a change in a voltage of an output power if a load is low.

According to an aspect of the invention, a switched-mode power supply includes a converter to convert input power into output power having a predetermined voltage by performing a switching operation; a light emitting unit to emit light indicative of the voltage of the output power if the voltage of the output power is equal to or greater than a predetermined threshold voltage; a light receiving unit to receive the light emitted from the light emitting unit and output a signal indicative of the voltage of the output power; an output power voltage indicating unit to receive the signal indicative of the voltage of the output power output from the light receiving unit and output an indication of the voltage of the output power; and a switching controller to control the switching operation of the converter according to the indication of the voltage level of the output power output from the output power voltage indicating unit; wherein the output power voltage indicating unit includes a switching unit to vary a characteristic of the output power voltage indicating unit according to a size of a load receiving the output power converted by the converter.

According to an aspect of the invention, the output power voltage indicating unit further includes a plurality of capacitors connected in parallel.

According to an aspect of the invention, the plurality of capacitors include a first capacitor to which the signal indicative of the voltage of the output power that is output from the light receiving unit is always applied; and a second capacitor to which the signal indicative of the voltage of the output power that is output from the light receiving unit is selectively applied by the switching unit according to the size of the load.

According to an aspect of the invention, the switching unit applies the signal indicative of the voltage of the output power to the second capacitor if the load is equal to or greater than a preset value, and does not apply the signal indicative of the voltage of the output power to the second capacitor if the load is less than the preset value.

According to an aspect of the invention, the switching unit includes a transistor that becomes conductive if the load is equal to or greater than the preset value.

According to an aspect of the invention, a power supplying method of a switched-mode power supply includes converting input power into output power having a predetermined voltage by performing a switching operation based on an indication of the voltage of the output power; and varying a characteristic of indicating the voltage of the output power according to a size of a load receiving the output power by performing another switching operation.

According to an aspect of the invention, the varying of the characteristic of indicating the voltage of the output power includes using a plurality of capacitors connected in parallel to vary the characteristic.

According to an aspect of the invention, the plurality of capacitors include a first capacitor to which a signal indicative of the voltage of the output power is always applied; and a second capacitor to which the signal indicative of the voltage of the output power is selectively applied by performing the other switching operation according to the size of the load.

According to an aspect of the invention, the other switching operation is performed to apply the signal indicative of the voltage of the output power to the second capacitor if the load is equal to or greater than a preset value, and to not apply the signal indicative of the voltage of the output power to the second capacitor if the load is less than the preset value.

According to an aspect of the invention, the other switching operation is performed by a transistor that becomes conductive if the load is equal to or greater than the preset value.

According to an aspect of the invention, a switched-mode power supply apparatus includes a converter to convert an input power into an output power having a predetermined voltage by performing a switching operation; a switching controller to control the switching operation of the converter based on an indication of the voltage of the output power; and an output power voltage indicating unit to provide the indication of the voltage of the output power to the switching controller according to a characteristic of the output power voltage indicating unit that varies according to a size of a load receiving the output power converted by the converter.

Additional aspects and/or advantages of the invention will be set forth in part in the description that follows and, in part, will be obvious from the description, or may be learned by practice of the invention.

BRIEF DESCRIPTION OF THE DRAWINGS

The above and/or other aspects and advantages of the invention will become apparent and more readily appreciated from the following description of embodiments of the invention, taken in conjunction with the accompanying drawings of which.

DETAILED DESCRIPTION OF THE EMBODIMENTS

Reference will now be made in detail to embodiments of the invention, examples of which are shown in the accompanying drawings, wherein like reference numerals refer to like elements throughout. The embodiments are described below in order to explain the invention by referring to the figures.

Figure 2:
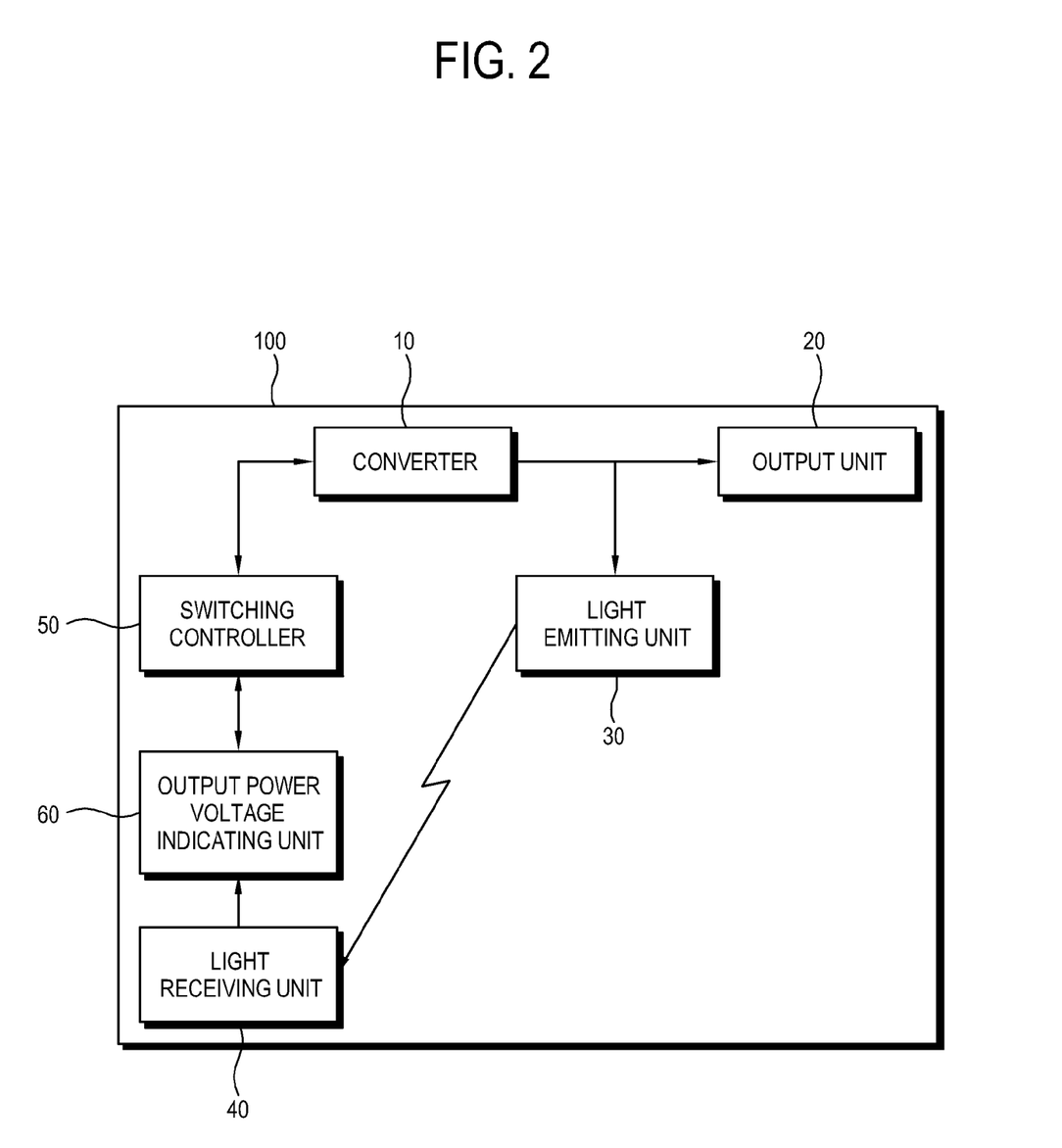
FIG. 2 is a block diagram of a switched-mode power supply according to an aspect of the invention.

FIG. 2 is a block diagram of a switched-mode power supply 100 according to an aspect of the invention. As shown in FIG. 2, the switched-mode power supply 100 includes a converter 10, an output unit 20, a light emitting unit 30, a light receiving unit 40, a switching controller 50, and an output power voltage indicating unit 60.

The converter 10 converts AC input power into DC output power having a predetermined voltage, and includes a transformer (not shown) having a primary winding and a secondary winding. The AC input power, which is received from an external AC power source, is rectified by a rectifier (not shown) to obtain DC power that is converted back into AC power by a switching unit (not shown) under control of the switching unit 50. The converted AC power is applied to the primary winding of the transformer, causing transformed AC power to be induced in the secondary winding of the transformer according to a turns ratio of the primary winding and the secondary winding. Then, the transformed AC power from the secondary winding is rectified by a rectifier (not shown) to obtain the DC output power having the predetermined voltage. The rectifier may include a diode (not shown) and a smoothing capacitor (not shown). However, it is understood that the converter 10 may have configurations other than that described above. For example, the transformer may be omitted. Many such configurations are known in the art, and therefore will not be described here.

Also, although the converter 10 has been described above as converting AC input power into DC output power, the converter 10 may convert AC input power into AC output power, or DC input power into AC output power, or DC input power into DC output power. Such types of converters are known in the art, and therefore will not be described here. However, for example, if the converter 10 converts DC input power into DC output power, the DC input power, which is received from an external DC power source, is converted into AC power by the switching unit (not shown) of the converter 10 under control of the switching controller 50, and the converted AC power is applied to the primary winding of the transformer (not shown) of the converter unit 10.

The output unit 20 outputs the output power from the converter 10 to an external load (not shown).

The light emitting unit 30 emits light indicative of the voltage of the output power if the voltage of the output power of the output unit 20 is equal to or greater than a predetermined threshold voltage, and the light receiving unit 40 receives the light emitted from the light emitting unit 30 and outputs a signal indicative of the voltage of the output power to the output power voltage indicating unit 60. While not required in all aspects of the invention, the light emitting unit 30 and the light receiving unit 40 may be integrated in a single chip in which they are insulated from each other to electrically isolate the circuit to which the light emitting unit 30 is connected from the circuit to which the light receiving unit 40 is connected. Such a chip is known, for example, as a photocoupler, an optocoupler, or an optoisolator.

The output power voltage indicating unit 60 indicates the voltage of the output power to the switching controller 50 based on the signal indicative of the voltage of the output power that is output from the light receiving unit 40 and in accordance with a characteristic that varies according to a size of the load receiving the output power from the output unit 20. It is preferable, but not required, that the characteristic is a response time to a change in the signal indicative of the voltage of the output power output from the light receiving unit, and that the response time increases as the load increases.

The switching controller 50 controls a switching operation of the converter 10 according to the voltage of the output power indicated by the output voltage indicating unit 60 by applying a pulse-width modulation (PWM) signal to the converter 10 to adjust the voltage of the output power of the converter 10. The generation of the PWM signal is known in the art, and therefore will not be described here.

Figure 3:
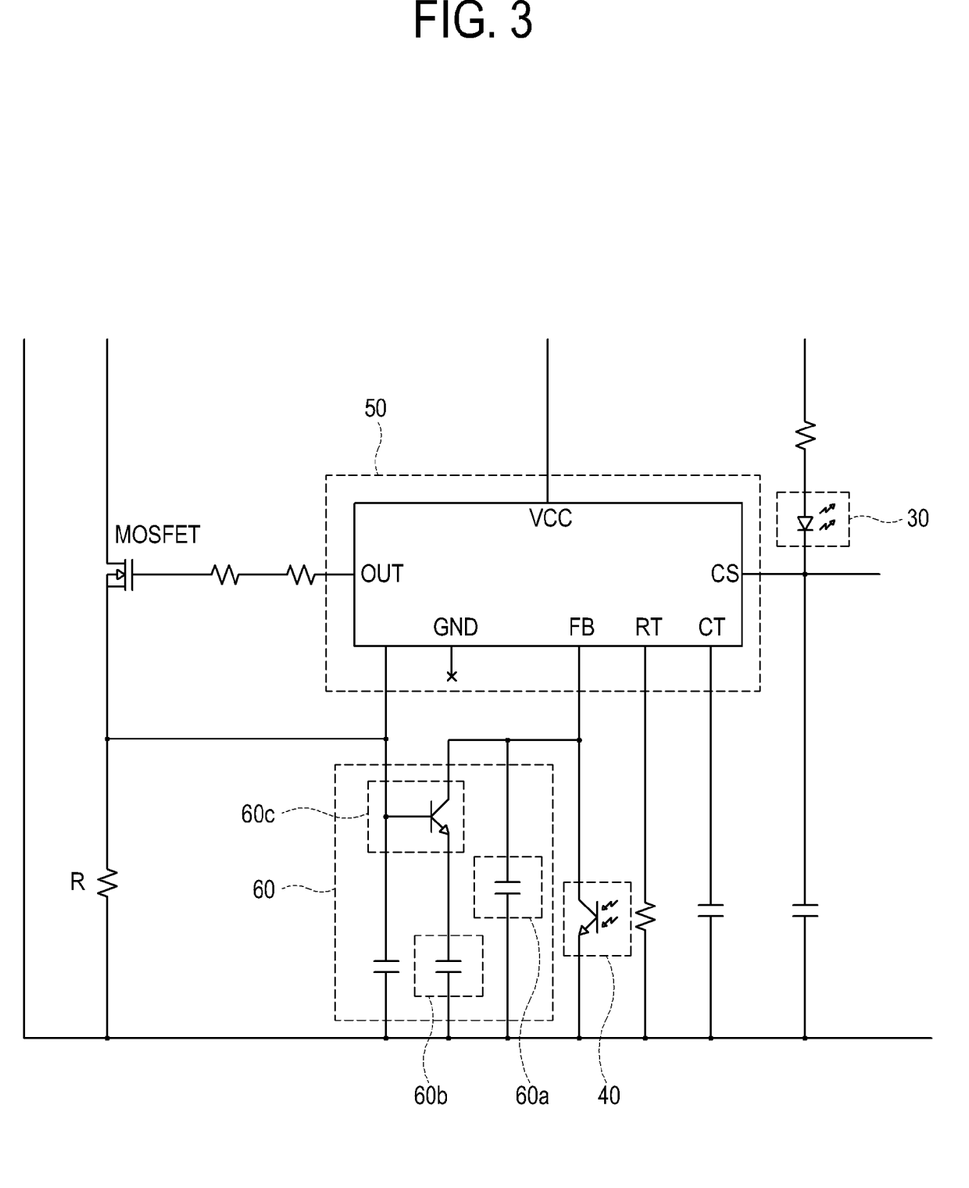
FIG. 3 is a circuit diagram of the switched-mode power supply of FIG. 2 according to an aspect of the invention.

Although not shown in FIGS. 2 and 3, the input power is input not only to the converter 10, but is also input to a VCC terminal (see FIG. 3) of the switching controller 50 through a smoothing capacitor and a start-up resistor (see FIG. 1B) to enable the switching controller 50 to operate during a start-up operation. A Zener diode (see FIG. 1B) connected between the VCC terminal and a CS terminal (see FIG. 3) of the switching controller 50 limits a voltage applied to the VCC terminal to a Zener voltage of the Zener diode.

FIG. 3 is a circuit diagram of the switched-mode power supply 100 of FIG. 2 according to an aspect of the invention. As shown in FIG. 3, the output power voltage indicating unit 60 includes a plurality of capacitors connected in parallel between a feedback terminal FB of the switching controller 50 and ground. An output terminal of the light receiving unit 40 is also connected to the feedback terminal FB. For example, as shown in FIG. 3, the output power voltage indicating unit 60 includes a first capacitor 60a and a second capacitor 60b. A switching unit 60c is connected between the feedback terminal FB and the second capacitor 60b. The switching unit 60c is turned off to form an open circuit and disconnect the second capacitor 60b from the feedback terminal FB if the load receiving the output power from the output unit 20 is lower than a preset value, and is turned on to form a closed circuit and connect the second capacitor 60b to the feedback terminal FB if the load is equal to or greater than the preset value. Accordingly, the signal indicative of the voltage of the output power that is output from the light receiving unit 40 is applied only to the first capacitor 60a if the load is lower than the preset value, and is applied to both the first capacitor 60a and the second capacitor 60b if the load is equal to or greater than the preset value. Although FIG. 3 shows that the switching unit 60c is a bipolar junction transistor (BJT), it is understood that other types of switching devices can be used as the switching unit 60c.

The switching unit 60c has a control terminal that receives a load size signal that is generated by a resistor R connected in series with a metal-oxide-semiconductor field-effect transistor (MOSFET). The switching unit 60c turns on or off depending on a voltage of the load size signal, which is a voltage across the resistor R. The MOSFET is part of the converter 10, and performs the switching operation of the converter 10 to adjust the voltage of the output power of the converter 10. The current flowing through the resistor R and the MOSFET, and thus the voltage of the load size signal, which is the voltage across the resistor R, is indicative of the size of the load receiving the output power from the output unit 10. When the load is lower than the preset value, the voltage of the load size signal is not high enough to turn the switching unit 60c on. Conversely, when the load is equal to or higher than the preset value, the load size signal is high enough to turn the resistor R on. However, it is understood that other ways of measuring the size of the load, and/or generating the load size signal, and/or controlling the operation the switching unit 60c based on the load size signal may be used When the voltage of the output power of the converter 10 changes, the voltage of the signal indicative of the voltage of the output power that is output from the light receiving unit 40 also changes. However, even though the output terminal of the light receiving unit 40 is connected to the feedback terminal FB, the voltage applied the feedback terminal FB cannot change immediately because the first capacitor 60a and, if the switching unit 60c is turned on, the second capacitor 60 first must be charged or discharged until the voltage across the first capacitor 60a and the second capacitor 60b becomes equal to the voltage of the signal indicative of the voltage of the output power that is output from the light receiving unit 40. When the load is lower than the preset value, only the first capacitor 60b is connected to the feedback terminal FB, and thus only the first capacitor 60a must be charged or discharged, so that a charging or discharging time will be short and a response time of the output power voltage indicating unit 60, and thus the switching controller 50, to a change in the voltage of the output power will be short, i.e., fast. On the other hand, when the load is equal to or greater than the preset value, both the first capacitor 60a and the second capacitor 60b are connected to the feedback terminal FB, and thus both the first capacitor 60a and the second capacitor 60b must be charged or discharged, so that the charging or discharging time will be long and the response time of the output power voltage indicating unit 60, and thus the switching controller 50, will be long, i.e., slow. However, the slow response of the output power voltage indicating unit 60 and the switching controller 50 will reduce fluctuations in the voltage of the output power of the converter 10 due to external disturbances, such as noise.

In FIG. 3, the output power voltage indicating unit 60 includes the first capacitor 60a and the second capacitor 60b by way of example, but the output power voltage indicating unit 60 is not limited to such a configuration. It is understood that the output power voltage indicating unit 60 may include additional capacitors in addition to the first capacitor 60a and the second capacitor 60b, and that the various capacitors may be connected or disconnected to the feedback terminal FB in multiple combinations depending on multiple levels of the load receiving the output power from the output unit 20.

Figure 4:
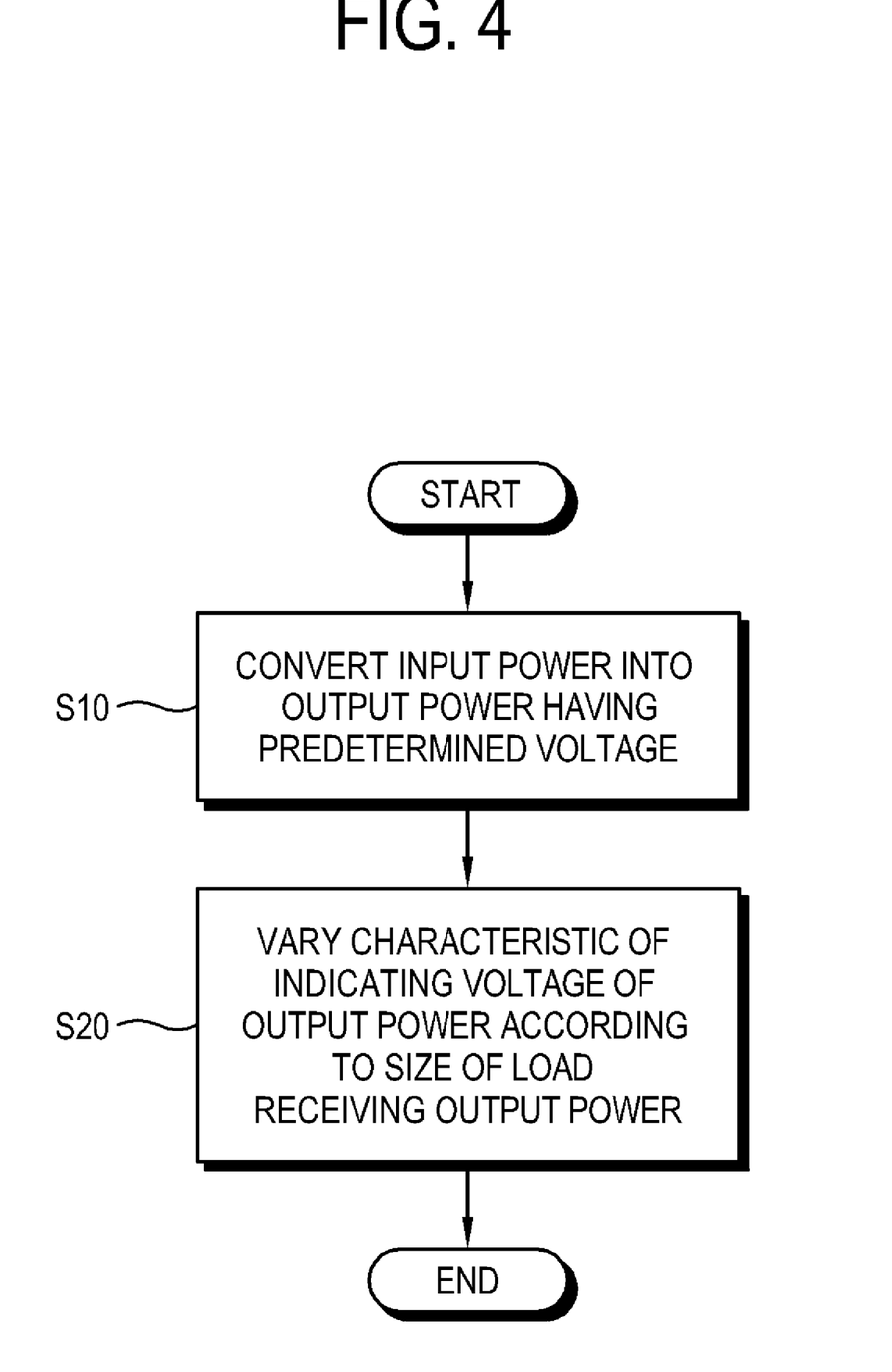
FIG. 4 is a flowchart of a power supplying method in a switched-mode power supply according to an aspect of the invention.

A power supplying method in the switched-mode power supply 100 of FIGS. 2 and 3 according to an aspect of the invention will now be described with reference to FIG. 4.

First, in operation S10, the converter 10 converts the input power into the output power having the predetermined voltage. Then, in operation S20, the output power voltage indicating unit 60 varies the characteristic of indicating the voltage of the output to the switching controller 50 according to the size of the load receiving the output power converted in the operation S10.

The characteristic of the output power voltage indicating unit 60 is determined by the first capacitor 60a and the second capacitor 60b, and varies depending on whether the second capacitor 60b is connected to or disconnected from the feedback terminal FB of the switching controller 50 by the switching unit 60c.

Accordingly, in the operation S20, the switching unit 60c is controlled to disconnect the second capacitor 60b from the feedback terminal FB when the load is smaller than the preset value, and to connect the second capacitor 60b to the feedback terminal FB when the load is equal to or greater than the preset value.

Accordingly, a load can be stably driven without malfunction even though the load is high.

Although several embodiments of the invention have been shown and described, it will be appreciated by those skilled in the art that changes may be made in these embodiments without departing from the principles and spirit of the invention, the scope of which is defined in the claims and their equivalents.

What is claimed is:

1. A switched-mode power supply comprising:
   a converter to convert input power into output power having a predetermined voltage by performing a switching operation;
   a light emitting unit to emit light indicative of the voltage of the output power if the voltage of the output power is equal to or greater than a predetermined threshold voltage;
   a light receiving unit to receive the light emitted from the light emitting unit and output a signal indicative of the voltage of the output power;
   an output power voltage indicating unit to receive the signal indicative of the voltage of the output power output from the light receiving unit and output an indication of the voltage of the output power; and
   a switching controller to control the switching operation of the converter according to the indication of the voltage of the output power output from the output power voltage indicating unit;
   wherein the output power voltage indicating unit comprises a switching unit to vary a characteristic of the output power voltage indicating unit according to a size of a load receiving the output power converted by the converter.

2. The switched-mode power supply of claim 1, wherein the output power voltage indicating unit further comprises a plurality of capacitors connected in parallel.

3. The switched-mode power supply of claim 2, wherein the plurality of capacitors comprise:
   a first capacitor to which the signal indicative of the voltage of the output power that is output from the light receiving unit is always applied; and
   a second capacitor to which the signal indicative of the voltage of the output power that is output from the light receiving unit is selectively applied by the switching unit according to the size of the load.

4. The switched-mode power supply of claim 3, wherein the switching unit applies the signal indicative of the voltage of the output power to the second capacitor if the load is equal to or greater than a preset value, and does not apply the signal indicative of the voltage of the output power to the second capacitor if the load is less than the preset value.

5. The switched-mode power supply of claim 4, wherein the switching unit comprises a transistor that becomes conductive if the load is equal to or greater than the preset value.

6. The switched-mode power supply of claim 1, wherein the characteristic of the output power voltage indicating unit is a response time of the output power voltage indicating unit to a change in the signal indicative of the voltage of the output power output from the light receiving unit.

7. The switched-mode power supply of claim 6, wherein the response time increases as the load increases.

8. A power supplying method of a switched-mode power supply, comprising:
   converting input power into output power having a predetermined voltage comprising performing a switching operation based on an indication of the voltage of the output power; and
   varying a characteristic of indicating the voltage of the output power according to a size of a load receiving the output power by performing another switching operation.

9. The power supplying method of claim 8, wherein the varying of the characteristic of indicating the voltage of the output power comprises using a plurality of capacitors connected in parallel to vary the characteristic.

10. The power supplying method of claim 9, wherein the plurality of capacitors comprise:
    a first capacitor to which a signal indicative of a voltage of the output power is always applied; and
    a second capacitor to which the signal indicative of the voltage of the output power is selectively applied by performing the other switching operation according to the size of the load.

11. The power supplying method of claim 10, wherein the other switching operation is performed to apply the signal indicative of the voltage of the output power to the second capacitor if the load is equal to or greater than a preset value, and to not apply the signal indicative of the voltage of the output power to the second capacitor if the load is less than the preset value.

12. The power supplying method of claim 11, wherein the other switching operation is performed by a transistor that becomes conductive if the load is equal to or greater than the preset value.

13. The power supplying method of claim 12, wherein the characteristic of the indicating of the voltage of the output power is a response time of the indicating of the voltage of the output power to a change in a signal indicative of the voltage of the output power.

14. The power supplying method of claim 13, wherein the response time increases as the load increases.

15. A switched-mode power supply apparatus comprising:
    a converter to convert an input power into an output power having a predetermined voltage by performing a switching operation;
    a switching controller to control the switching operation of the converter based on an indication of the voltage of the output power; and
    an output power voltage indicating unit to provide the indication of the voltage of the output power to the switching controller according to a characteristic of the output power voltage indicating unit that varies according to a size of a load receiving the output power converted by the converter.

16. The switched-mode power supply of claim 15, wherein:
    the switching controller comprises a feedback terminal to receive the indication of the voltage of the output power; and
    the output power voltage indicating unit comprises:
    a first capacitor comprising a first terminal connected to the feedback terminal, and a second terminal;
    a switching unit comprising a first terminal connected to the feedback terminal, and a second terminal;
    a second capacitor comprising a first terminal connected to the second terminal of the switching unit, and a second terminal connected to the second terminal of the first capacitor; and
    wherein the switching unit connects the second capacitor to the feedback terminal if the load is equal to or greater than a preset value, and disconnects the second capacitor from the feedback terminal if the load is less than the preset value.

17. The switched-mode power supply of claim 16, further comprising a unit to generate a signal indicative of the voltage of the output power, and to provide the signal indicative of the voltage of the output power to the feedback terminal of the converter.

18. The switched-mode power supply of claim 16, wherein:
- the converter comprises a switching device to perform the switching operation of the converter under control of the switching controller;
- the switched-mode power supply further comprises a resistor connected in series with the switching device of the converter to generate a load size signal having a voltage that varies with the size of the load; and
- the switching unit comprises a control terminal to receive the load size signal, and connects the second capacitor to the feedback terminal if the voltage of the load size signal indicates that the load is equal to or greater than a preset value, and disconnects the second capacitor from the feedback terminal if the voltage of the load size signal indicates that the load is less than the preset value.

19. The switched-mode power supply of claim 15, wherein the characteristic of the output power voltage indicating unit is a response time of the output power voltage indicating unit to a change in the signal indicative of the voltage of the output power output from the light receiving unit.

20. The switched-mode power supply of claim 19, wherein the response time increases as the load increases.

* * * * *

UNITED STATES PATENT AND TRADEMARK OFFICE
CERTIFICATE OF CORRECTION

| | | |
|---|---|---|
| PATENT NO. | : 7,782,634 B2 | Page 1 of 1 |
| APPLICATION NO. | : 12/129833 | |
| DATED | : August 24, 2010 | |
| INVENTOR(S) | : Tae-kwon Na | |

It is certified that error appears in the above-identified patent and that said Letters Patent is hereby corrected as shown below:

Column 8, Line 21 delete "claim 12," and insert -- claim 8, --, therefor.

Signed and Sealed this
Fifteenth Day of March, 2011

David J. Kappos
*Director of the United States Patent and Trademark Office*